April 13, 1954
J. D. TEBOW
2,675,181
ICE CRUSHER
Filed Aug. 31, 1949
2 Sheets-Sheet 1
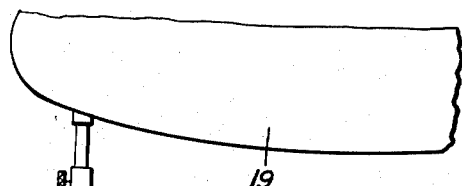
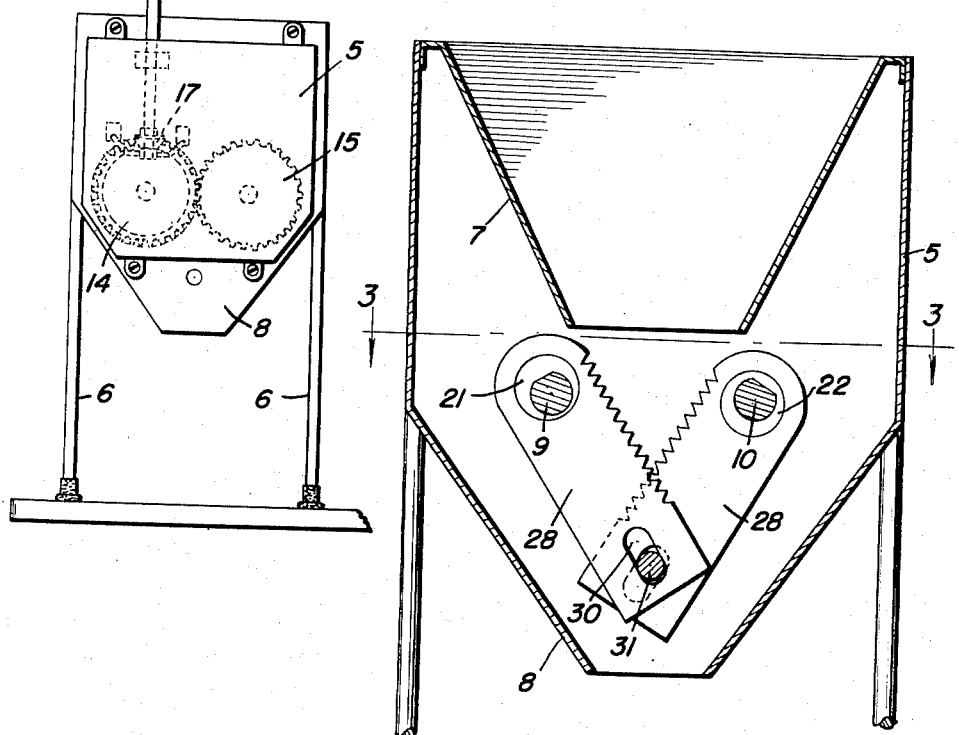
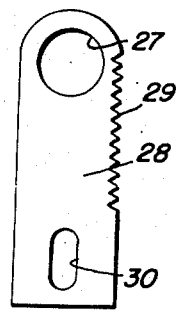
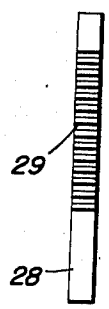
John D. Tebow
INVENTOR.
BY
Attorneys April 13, 1954     J. D. TEBOW     2,675,181
ICE CRUSHER
Filed Aug. 31, 1949                 2 Sheets-Sheet 2

John D. Tebow
INVENTOR.
BY
Attorneys

Patented Apr. 13, 1954

2,675,181

UNITED STATES PATENT OFFICE 2,675,181

ICE CRUSHER

John D. Tebow, Alameda, Calif.

Application August 31, 1949, Serial No. 113,360

2 Claims. (Cl. 241—266)

The present invention relates to new and useful improvements in ice crushers designed primarily for crushing ice cubes.

An important object of the invention is to provide a power operated ice crusher embodying means for connecting a drive shaft for the crusher to a conventional type of food mixer to utilize the motor of the mixer for operating the crusher.

Another object is to provide a novel crusher blade construction and connecting the blades in groups on a pair of shafts with means for operating the blades in a reciprocating movement, and with the groups of blades in V-shaped arrangement with each other to form jaws between which the ice is fed.

A further object is to provide an ice crusher of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the ice crusher connected to a food mixer;

Figure 2 is an enlarged vertical sectional view of the ice hopper;

Figure 10 is a side elevational view of one of the blades; and,

Figure 11 is an edge elevational view thereof.

Figure 3:
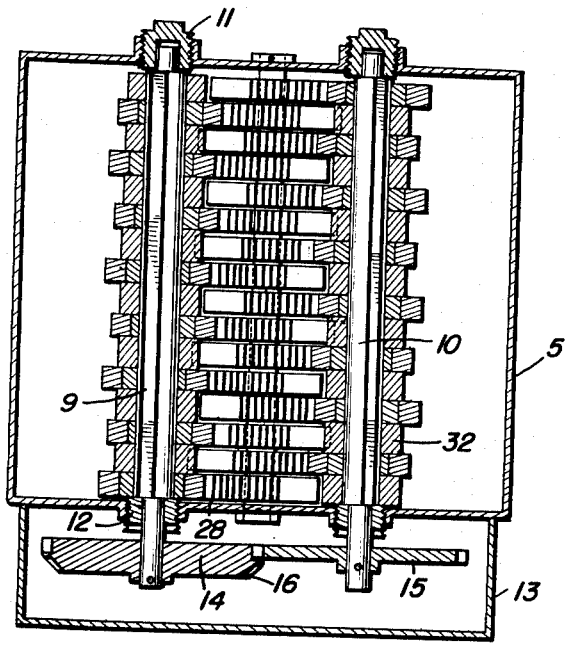
Figure 3 is a horizontal sectional view taken on a line 3—3 of Figure 2.
Figure 4:
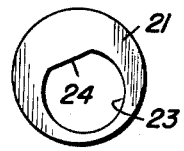
Figure 4 is a side elevational view of one of the cams for operating the blades of one shaft.
Figure 5:
Figure 5 is an edge elevational view thereof.
Figure 7:
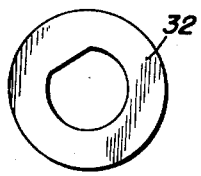
Figure 7 is a side elevational view of one of the spacing washers for the blades.
Figure 8:
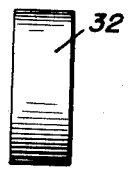
Figure 8 is an edge elevational view thereof.
Figure 6:
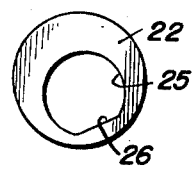
Figure 6 is a side elevational view of one of the cams for operating the blades of the second shaft.
Figure 9:
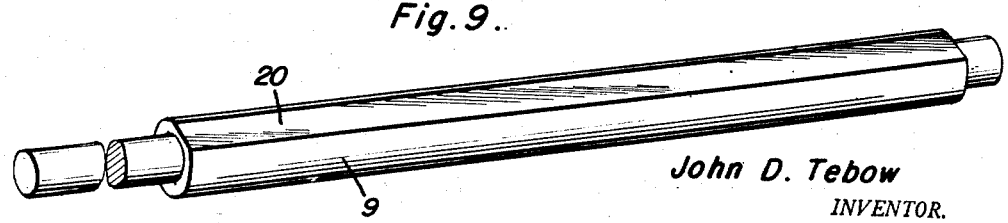
Figure 9 is a perspective view of one of the shafts.

Referring now to the drawings in detail wherein for the purpose of illustration I have disclosed a preferred embodiment of my invention, the numeral 5 designates a hopper supported on legs 6 and having an entrance funnel 7 in its upper portion, and a discharge spout 8 at its bottom.

A pair of shafts 9 and 10 are journalled at their end portions in the opposite sides of the hopper and in spaced parallel relation to each other, one end of the shafts being enclosed in bearing caps 11, while the other ends of the shafts are journalled in bushings 12 to project the last named ends of the shafts outwardly of the hopper into a gear housing 13 suitably secured to an adjacent side of the hopper.

Gears 14 and 15 are secured to the shafts 9 and 10 in gear housing 13, the gears being of the spur type meshing with each other to oppositely rotate the shafts, gear 14 being formed with a bevel gear 16 driven by a bevel gear 17 at the lower end of a vertical shaft 18 having its upper end projecting upwardly from gear housing 13 for attaching to a suitable power means, such as a conventional type of food mixer 19.

The shafts 9 and 10 are formed inwardly of their end portions with a flat side 20 and eccentrics 21 are positioned on shaft 9 and eccentrics 22 are positioned on shaft 10. Eccentrics 21 and 22 are of disk form, eccentrics 21 having an eccentric opening 23 with a flat portion 24 adjacent the center of the disk and eccentrics 22 are also formed with an eccentric opening 25 having a flat side 26 adjacent the periphery of the disk.

The disks 21 and 22 are rotatably mounted in openings 27 at the upper ends of crusher blades 28, each blade having a toothed longitudinal edge 29 and a longitudinal slot 30 adjacent their lower ends. A rod 31 is supported in a fixed position in discharge spout 8, the rod being positioned in the lower slots 30 of the blades of both shafts to support a group of blades on each shaft in V-shaped arrangement, with the teeth of one group of blades opposing the teeth of the other group of blades, as shown in Figure 2.

Spacing washers 32 are positioned on the shafts between adjacent blades to provide for the working of the blades of one shaft in side by side overlapping relation between the blades of the other shaft, as indicated in Figure 3, the washers also having flattened internal portions for rotation with the shafts.

In the operation of the device, shafts 9 and 10 are driven in opposite directions by gears 14 and 15, and the flattened portions 20 of the shafts and eccentrics 21 and 22 positioned on the respective shafts to oppositely raise and lower the groups of blades 28 connected to the respective shafts.

Accordingly, as ice is supplied to the hopper and fed between the blades, a grinding or crushing action will result. The spacing washers 32 are of a thickness greater than the thickness of the blades to prevent jamming of the crushed ice between the blades and the crushed ice falls from the blades under the washers of the opposite shaft.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An ice crusher comprising a hopper, a pair of driven shafts journalled in the hopper in spaced parallel relation to each other, groups of crusher blades spaced along the shafts and connected at one end to the shafts for reciprocating movement of the blades in group endwise, and a rod supported in the hopper below the shafts and in parallelism therewith and holding the groups of blades in V-shaped slidably connected relation with the blades of each group crossing the blades of the other group, and eccentrics on said pair of shafts reciprocating said groups of blades oppositely in each group relative to those in the other group.

2. An ice crusher comprising a hopper, a pair of driven shafts journalled in the hopper in spaced parallel relation to each other, eccentrics mounted on each shaft for rotation thereby, groups of crusher blades spaced along the shafts and connected at one end to the eccentrics for actuating the blades in a reciprocating movement endwise, and means holding the blades in V-shaped slidably connected and pivoted relation, said eccentrics reciprocating said groups of blades oppositely in each group relative to those in the other group.

References Cited in the file of this patent

UNITED STATES PATENTS

| Number | Name | Date |
|---|---|---|
| 307,820 | Tiffany | Nov. 11, 1884 |
| 785,617 | Knapp | Mar. 21, 1905 |
| 1,053,220 | Ribeyron | Feb. 18, 1913 |
| 1,491,430 | Stebbins | Apr. 22, 1924 |

FOREIGN PATENTS

| Number | Country | Date |
|---|---|---|
| 344,133 | Germany | Nov. 17, 1921 |